United States Patent [19]

Wright

[11] Patent Number: 5,044,815

[45] Date of Patent: Sep. 3, 1991

[54] METHOD AND APPARATUS FOR CONNECTING CASTINGS

[76] Inventor: Joey D. Wright, 200 Arthur, Blair, Nebr. 68008

[21] Appl. No.: 527,744

[22] Filed: May 18, 1990

[51] Int. Cl.⁵ ............................................. F16D 1/00
[52] U.S. Cl. .................................. 403/338; 285/364; 47/23
[58] Field of Search ............... 403/338; 285/364, 406; 47/23; 411/337

[56] References Cited

U.S. PATENT DOCUMENTS

| 254,135 | 2/1882 | Hornung et al. | 47/23 |
| 1,096,269 | 5/1914 | Saxe | 411/337 |
| 2,614,796 | 10/1952 | Miller | 403/338 |
| 2,945,704 | 7/1960 | Korn | 285/364 X |
| 3,466,799 | 9/1969 | Stilson | 403/338 X |
| 4,082,324 | 4/1978 | Obrecht | 403/338 X |

Primary Examiner—Andrew V. Kundrat
Attorney, Agent, or Firm—Zarley, McKee, Thomte, Voorhees & Sease

[57] ABSTRACT

An apparatus for connecting castings includes an elongated screw having a threaded shank and head, a washer mounted on the screw, and a rigid bracket removably and operably mounted on the screw shank. Each connecting apparatus is mounted between the abutting edges of a pair of castings, so as to align and retain the castings in their aligned position. The castings each include a vertical edge having a flange therealong with a generally flat exterior surface, such that the exterior surfaces of the flanges of abutting castings will be parallel and adjacent. The connecting apparatus bracket has a pair of diverging legs which will engage the vertical flanges when moved along the screw shank towards the screw head. Each casting also includes upper and lower flanges, the flanges of a pair of castings being positioned in abutting contact so as to stack the castings. The screw of a connector apparatus is interposed between the abutting flanges with a washer abutting the exterior surfaces of the castings. A bracket is then mounted on the shank of the screw and moved toward the screw head into engagement with the abutting flanges.

11 Claims, 3 Drawing Sheets

METHOD AND APPARATUS FOR CONNECTING CASTINGS

TECHNICAL FIELD

The present invention relates generally to a system for connecting castings of fiber reinforced plaster or concrete, and more particularly to an improved method and apparatus for connecting plaster or concrete castings to form a column or the like.

BACKGROUND OF THE INVENTION

Concrete castings, as well a plaster castings reinforced with glass fiber, have become a quick and economical way of constructing hollow columns to surround structural beams, poles or the like. Conventionally, the castings are semicylindrical in shape and are connected together and stacked to form a column which houses the structural member.

The difficulties present in conventional construction utilizing such castings, is in forming a column which has all of the castings perfectly aligned. Such alignment is necessary so that when spackle or other filler material is applied to cover seams and cracks, the finished appearance of the column is a single integral unit. This alignment of one or more castings not only requires large amounts of finishing materials, but also detracts from the integral finished appearance of the structure.

One method currently utilized to connect a pair of semicylindrical castings is to utilize a channel member having one half mounted to each edge of the castings. The screws which are inserted through the casting into the channel member are then covered with a finishing spackle to finish the appearance of the entire unit. However, such a method is difficult to install at the site, and therefore requires extensive labor and time to construct.

Furthermore, conventional methods for connecting the castings required skilled labor to align the castings and connect them in proper alignment.

It is therefore a general object of the present invention to provide an improved method and apparatus for connecting castings.

Another object of the present invention is to provide a method for connecting castings which is quick and simple to utilize so as to avoid the necessity of skilled labor.

A further object of the present invention is to provide an apparatus for connecting castings which will automatically align the castings upon tightening of the connector apparatus.

Yet another object is to provide a method and apparatus for connecting castings which utilizes simple and economical parts and may be quickly assembled.

These and other objects of the present invention will be apparent to those skilled in the art.

SUMMARY OF THE INVENTION

The apparatus for connecting castings of the present invention includes an elongated screw having a threaded shank and head, a washer mounted on the screw, and a rigid bracket removably and operably mounted on the screw shank. Each connecting apparatus is mounted between the abutting edges of a pair of castings, so as to align and retain the castings in their aligned position. The castings each include a vertical edge having a flange therealong with a generally flat exterior surface, such that the exterior surfaces of the flanges of abutting castings will be parallel and adjacent. The connecting apparatus bracket has a pair of diverging legs which will engage the vertical flanges when moved along the screw shank towards the screw head. The washer on the screw shank serves to align the exterior surfaces of the castings as the bracket is moved toward the screw head, while the bracket forces the flanges tightly together.

Each casting also includes upper and lower edges and upper and lower flanges, the upper flanges having a flat top surface and the lower flanges having a flat bottom surface, the flat surfaces of the flanges being positioned in abutting contact so as to stack the castings. The screw of a connector apparatus is interposed between the abutting flanges with a washer abutting the exterior surfaces of the castings. A bracket is then mounted on the shank of the screw and moved toward the screw head into engagement with the abutting flanges.

An adhesive may be applied to the vertical flanges and the upper and lower flanges to retain the castings in permanently aligned position. When adhesive is utilized, the screws and washers may be removed from the castings once the adhesive has set. The joints between the castings may then be finished with spackle or the like so as to eliminate joint lines. In the alternative, the castings may be formed with a tapered edge, so that the screws may be completely covered with spackle, and then finished.

DESCRIPTION OF THE PREFERRED EMBODIMENTS

Figure 1:
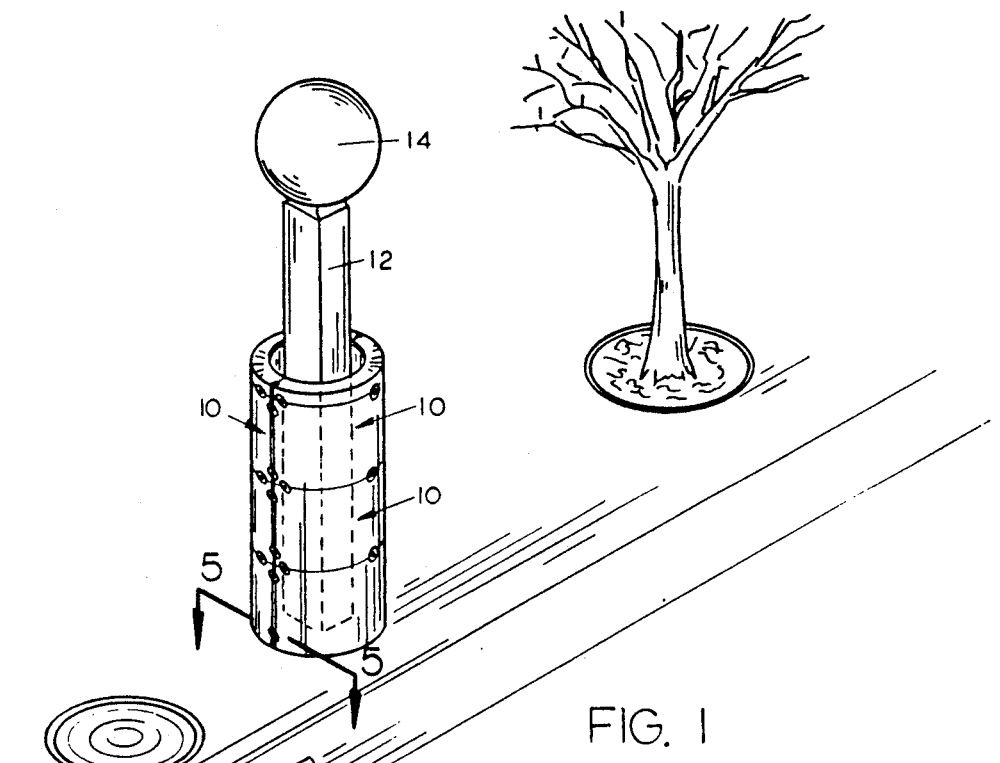
FIG. 1 is a pictorial view of a structural member with the method of the present invention being utilized to construct a casing around the structural member.

Referring now to the drawings, in which similar or corresponding parts are identified with the same reference numeral, and more particularly to FIG. 1, the method and apparatus of the present invention is utilized to connect a plurality of castings 10 to form a hollow column or the like. Typically, the formed column will serve to hide and/or protect a structural member 12, such as that utilized to support a lamp 14.

Figure 2:
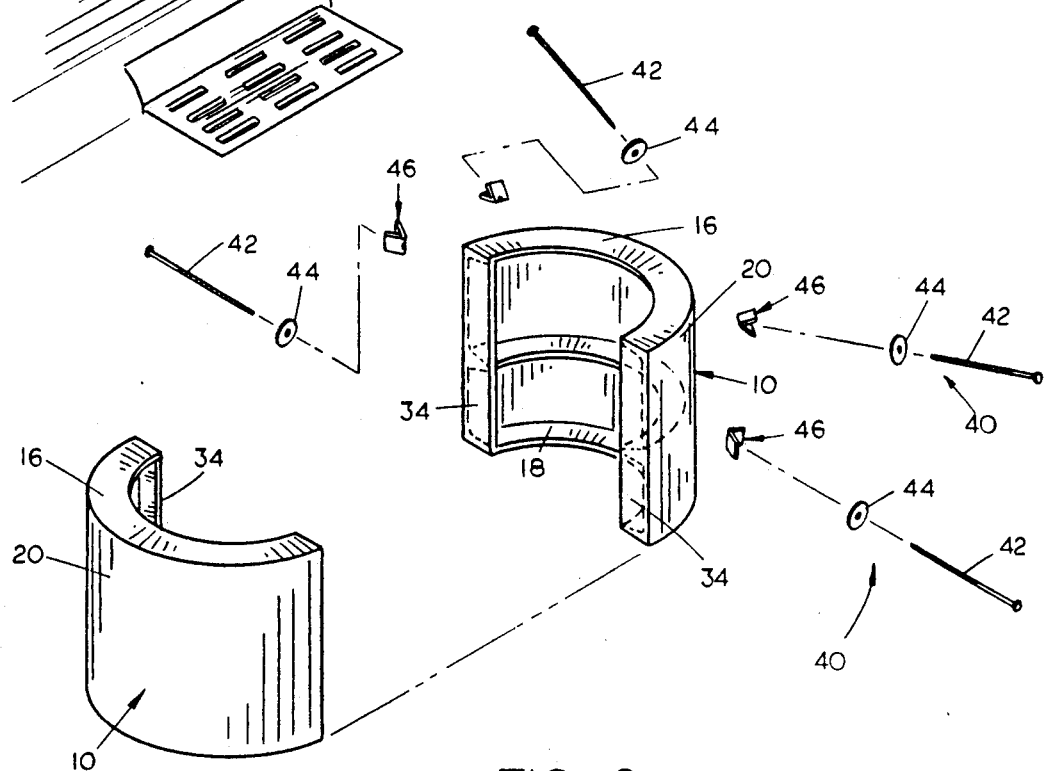
FIG. 2 is an exploded perspective view of a pair of castings and several connector apparatus therewith.

Referring now to FIG. 2, each casting 10 is preferably formed of plaster reinforced with glass fibers, and is semicylindrical in shape. Castings 10 may also be of concrete, or other similar materials. Castings 10 include an upper flange 16 and lower flange 18 projecting radially inwardly from the upper and lower edges of the outer semicylindrical surface 20 of casting 10.

Figure 4:
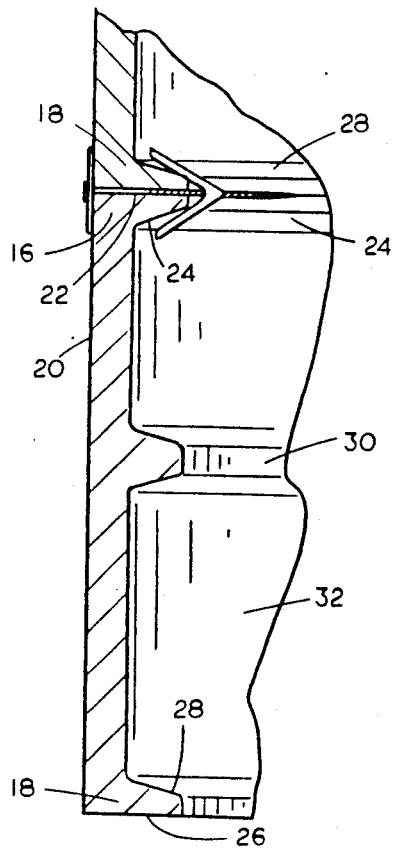
FIG. 4 is a partial sectional view taken at lines 4—4 in FIG. 3.

As shown in FIG. 4, upper flange 16 has a flat top surface 22 which is perpendicular to outer surface 20. Upper flange 16 has a tapered bottom surface 24, which reduces in thickness as it proceeds radially inwardly on the flange to form a wedge shape. Lower flange 18 is the reverse of upper flange 16, and has a flat bottom surface 26 and a tapered top surface 28, also forming a wedge shape. Thus, when one casting is stacked atop another, the flat bottom surface 26 of lower flange 18 will be adjacent and parallel to the flat top surface 22 of upper flange 16 of the next adjacent casting 10.

A central rib 30 extends on the interior surface 32 of casting 10 parallel to flanges 16 and 18, and extends radially inwardly therefrom. Rib 30 is a structural element to support casting 10.

Figure 5:
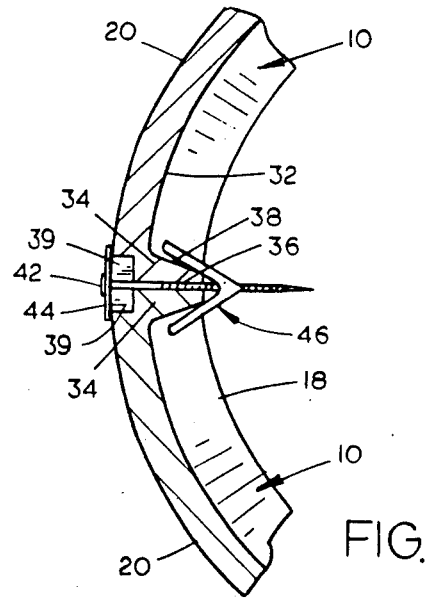
FIG. 5 is a partial sectional view taken at lines 5—5 in FIG. 1.

Each casting 10 further includes a pair of vertical edge flanges 34 extending radially inwardly from each vertical edge of exterior surface 20 from upper flange 16 to lower flange 18, as shown in FIGS. 2 and 5. Vertical flanges 34 have a flat exterior surface 36 perpendicular to exterior surface 20 of castings 10, and a tapered interior surface 38 tapering radially inwardly, forming a wedge shape. A notch 39 may be formed at the juncture of exterior surface 20 of castings 10 and the exterior surface 36 of flanges 34, which will be filled with spackle or the like after the castings 10 have been connected.

Figure 6:
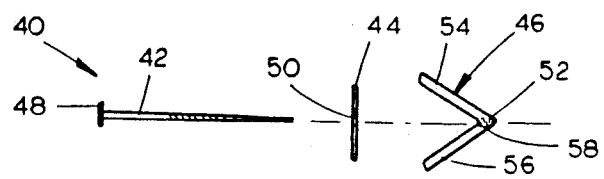
FIG. 6 is an enlarged exploded view of a connector apparatus of the present invention.

Referring now to FIG. 6, the connecting apparatus the spackle may then be sanded or finished in conventional fashion to form a smooth, uninterrupted surface for connecting castings 10 is designated generally at 40 and includes an elongated threaded screw 42, a large diameter flat washer 44 and a bracket designated generally at 46. Screw 42 has an enlarged head 48 which will abut against washer 44 when screw 42 is inserted through aperture 50 therein. Screw 42 is then threaded through threaded aperture 52 centered in bracket 46 so as to draw bracket 46 towards washer 44 when screw 42 is rotated in a clockwise direction. Bracket 46 includes a pair of legs 54 and 56 connected at a joint 58 such that legs 54 and 56 diverge from joint 58. Threaded aperture 52 is centered through joint 58 along an axis which bisects the angle formed between legs 54 and 56.

In operation, a first pair of castings 10 are joined to form a generally hollow cylindrical structure, as shown in FIG. 2. A pair of connecting apparatus 40 are utilized along each pair of abutting vertical edge flanges 34, one connecting apparatus 40 near the upper end and one connecting apparatus 40 near the lower end. Screw 42 is inserted through washer 44 and then inserted between the abutting vertical flanges 34, and bracket 52 is then threaded on screw 42, as shown in FIG. 5. Rotation of screw 42 will draw bracket 46 towards vertical flanges 34, and will tighten washer 44 against the outer surface 20 of castings 10. It can be seen that washer 44 will align the exterior surfaces 20 of the castings 10 as screw 42 is tightened. Simultaneously, legs 54 and 56 will contact the tapered inner surfaces 38 of flanges 34 to tighten the abutting contact of vertical flanges 34.

Figure 3:
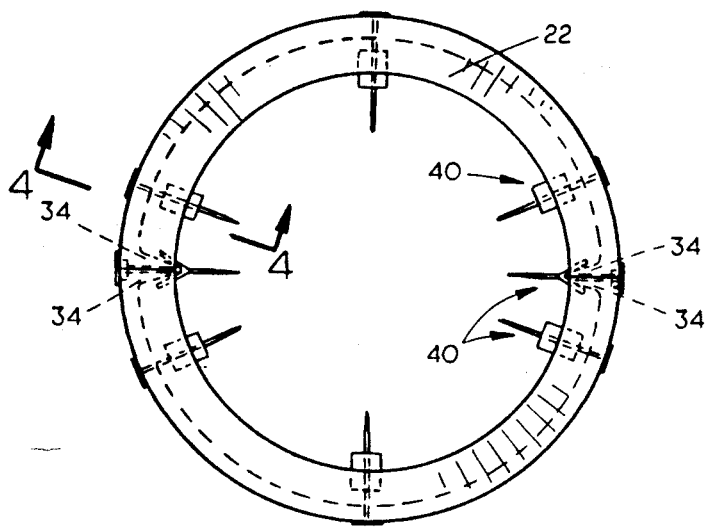
FIG. 3 is a top view of a pair of castings connected utilizing the method of this invention.

Once the first hollow cylindrical course has been formed, a second course may be fastened to the top thereof utilizing additional sets of connecting apparatus 40, as shown in FIGS. 3 and 4. Preferably, three connecting apparatus 40 are utilized to connect the lower flanges 18 of the upper course to the upper flanges 16 of the lower course. These steps continue until a column of the desired height has been formed.

In most cases, it is preferable to apply adhesive to the exterior flat surfaces 36 of vertical flanges 34, as well as the flat top surface 22 of upper flange 16 and the flat bottom surface 26 of lower flange 18, between abutting pairs of vertical flanges and abutting pairs of upper and lower flanges. Once the adhesive applied between all of the contacting surfaces of the various castings has set, screws 42 may be backed out of brackets 46 and removed from formed column. Spackle or the like may then be utilized to finish the notches 39 and any cracks or the like in the column.

In the alternative, notches 39 may be eliminated and replaced with a tapered surface. In such a case, the screws may be left in place and spackle applied over the top to completely cover the screws and joint. The spackled joints may then be finished as desired.

Figure 7:
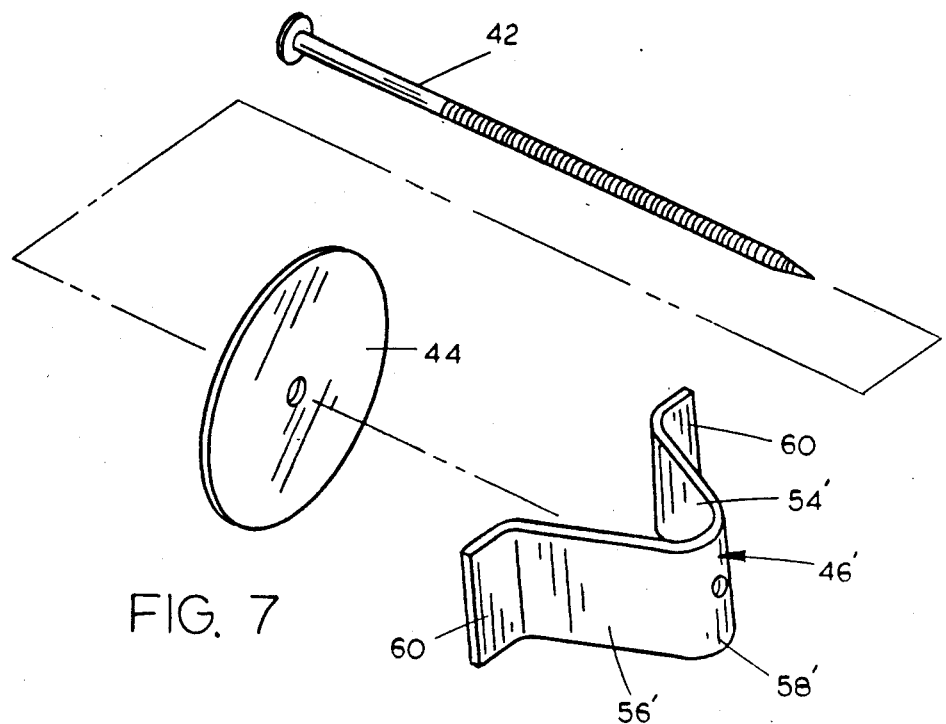
FIG. 7 is an enlarged exploded perspective view of a second embodiment of the present invention.
Figure 8:
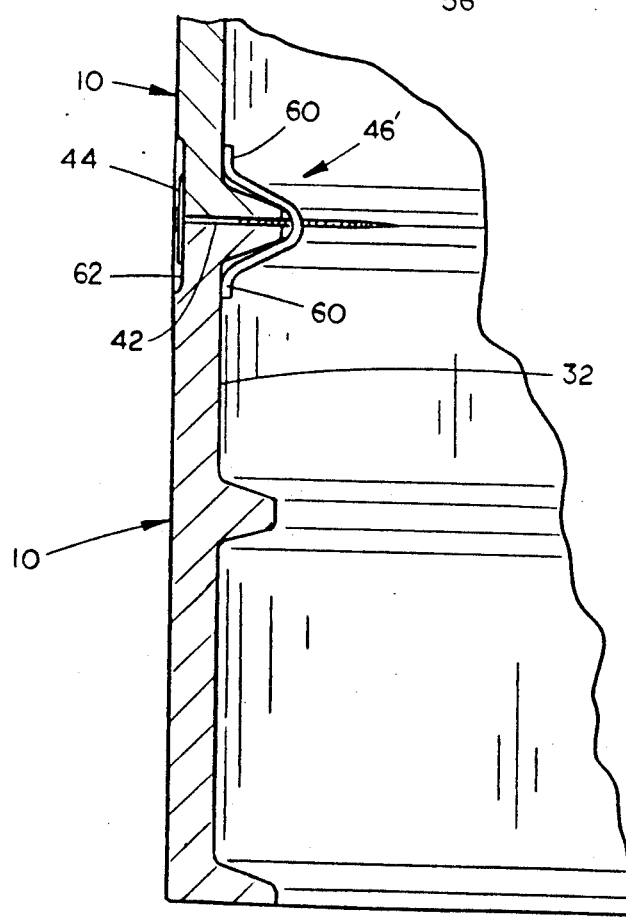
FIG. 8 is a vertical sectional view similar to FIG. 4, utilizing the second embodiment of FIG. 6.

Referring now to FIGS. 7 and 8, a second embodiment of the invention is shown which utilizes the same screw 42 and washer 44, with a modified bracket 46'. Bracket 46' includes a pair of diverging legs 54' and 56' which diverge from junction 58'. The ends of legs 54' and 56' have a flattened lip 60 projecting generally perpendicular to the access of threaded screw 42, so as to abut the inside surface 32 of castings 10 when threaded on screw 42.

Whereas the invention has been shown and described in connection with the preferred embodiments thereof, it will be understood that many modifications, substitutions and additions may be made which are within the intended broad scope of the appended claims. For example, screw 42 and washer 44 need not necessarily be removed from the castings, if a taper 62 (see FIG. 8) is provided. Spackle may then be applied over the top of screw 42 and washer 44, and finished. Thus, there has been shown and described a method and apparatus for connecting castings which accomplishes at least all of the above stated objects.

I claim:

1. An apparatus for connecting castings, comprising:
   an elongated screw having a threaded shank and a head;
   a washer mounted on said screw and adapted to abut against the screw head;
   a rigid, non-bendable bracket removably and operably mounted on said threaded screw shank;
   said bracket including a threaded aperture therethrough for threaded engagement with said threaded screw shank, such that rotation of the screw with respect to the bracket will move the bracket towards, or away from, the screw head;
   said bracket including first and second legs connected at one end to form a junction, said threaded aperture formed in said junction, and said legs diverging from said junction at substantially equal angles from the axis of said threaded aperture; and
   said bracket further comprising first and second lip portions projecting from the free ends of said first and second legs, respectively, said lip extending outwardly from said legs at an angle generally perpendicular to the axis of said threaded aperture.

2. In combination:
   first and second castings connected together to form a hollow structure;
   each said casting including:
      an upper edge, a lower edge, an interior surface, an exterior surface, and a pair of vertical edges;
      each vertical edge further including a flange therealong having a generally flat exterior surface oriented generally perpendicular to the exterior surface of the casting, and a tapered interior surface to form a wedge shape;

said first and second castings oriented with their respective vertical edges in abutting relation with the flat exterior surfaces of said vertical flanges parallel to one another;

at least one connector apparatus operably mounted to each pair of abutting vertical flanges;

each connector apparatus including:
an elongated screw having a shank and a head, located generally horizontally between the adjacent flat exterior surfaces of a pair of vertical flanges;
a washer mounted on said screw between said screw head and the exterior surface of said castings, said washer having a diameter large enough to overlap and align a portion of the exterior surfaces of said adjacent castings; and
a rigid, non-bendable bracket means removably and operably mounted on said screw shank, for forcing said adjacent vertical flanges together when said bracket is moved towards the screw head.

3. The combination of claim 2, wherein said screw shank is threaded, and wherein said bracket means includes a threaded aperture therethrough for threaded engagement with said threaded screw shank, such that rotation of the screw with respect to the bracket will move the bracket towards, or away from, the screw head.

4. The combination of claim 3, wherein said bracket means includes a pair of legs connected at one end to form a junction, said threaded aperture formed in said junction, said legs diverting from said injunction so as to engage the tapered interior surfaces of said adjacent vertical flanges.

5. The combination of claim 4, wherein said legs diverge at generally congruent angles with respect to the axis of said bracket aperture.

6. The combination of claim 2, wherein said castings are formed from plaster reinforced with glass fibers.

7. The combination of claim 2, further comprising:
third and fourth castings connected together to form a hollow structure, said third and fourth castings connected to said first and second castings to form a single hollow structure;
said third and fourth castings including upper and lower edges, an interior surface and an exterior surface;
said first, second, third and fourth castings each further including:
the upper edge including an upper flange therealong having a generally flat top surface oriented generally perpendicular to the exterior surface of the casting, and a tapered bottom surface, to form a wedge shape;
the lower edge including a lower flange therealong having a generally flat bottom surface oriented generally perpendicular to the exterior surface of the casting, and a tapered top surface, to form a wedge shape;
at least a first second connector apparatus operably mounted to connect the upper flange of said first casting with the lower flange of said third casting;
at least a second connector apparatus operably mounted to connect the upper flange of said second casting with lower flange of said fourth casting;
each said second connector apparatus, including:
an elongated screw having a shank and head, located between the adjacent top surface of the upper flange and bottom surface of the lower flange;
a washer mounted on said screw between the head and exterior surfaces of the castings, said washer having a diameter large enough to overlap and align a portion of the exterior surfaces of said vertically adjacent castings; and
a rigid non-bendable bracket means removably and operably mounted on said screw shank, for forcing said adjacent upper and lower flanges together when said bracket is moved towards the screw head.

8. A method for connecting castings, comprising the steps of:
providing first and second castings, each said casting including:
an upper edge, a lower edge, an interior surface, an exterior surface, and a pair of vertical edges;
each vertical edge further including a flange therealong having a generally flat exterior surface oriented generally perpendicular to the exterior surface of the casting, and a tapered interior surface to form a wedge shape;
positioning said first and second castings with their respective vertical edges in abutting relation, with the flat exterior surfaces of said vertical flanges parallel to one another;
providing at least one connector apparatus for connecting each pair of adjacent vertical flanges, each said connector apparatus including:
an elongated screw having a threaded shank and a head;
a washer mounted on said screw and adapted to abut against the screw head; and
a rigid, non-bendable bracket removably and operably mounted on said threaded screw shank;
positioning said washers on said shanks:
interposing one screw between the adjacent flat exterior surfaces of each pair of vertical flanges, with said washer located in abutting contact between said screw head and a portion of the exterior surfaces of said adjacent castings, and with said shank projecting beyond said vertical flanges;
mounting each said bracket means on each screw shank; and
operably moving said brackets towards their associated screw heads so as to engage said vertical flanges and force them together, and to align the exterior surfaces of the castings.

9. The method of claim 8, further comprising the step of applying adhesive to the flat exterior surfaces of said vertical flanges prior to the step of positioning said castings, such that the adhesive will retain the castings in alignment after the adhesive has set and cured.

10. The method of claim 9, further comprising the step of removing connector apparatus screws and washers after the adhesive has set and cured.

11. The method of claim 10, further comprising the step of applying a finishing material over those locations where the vertical edges meet.

* * * * *